US006674875B1

(12) United States Patent
Phillips et al.

(10) Patent No.: US 6,674,875 B1
(45) Date of Patent: Jan. 6, 2004

(54) ANTI-COUNTERFEITING AND DIFFUSIVE SCREENS

(75) Inventors: Nicholas John Phillips, Loughborough (GB); Jonathan Michael Blackledge, Leicester (GB); William Nevil Heaton Johnson, St. Peter Port (GB)

(73) Assignee: Durand Limited, Guernsey (GB)

( * ) Notice: Subject to any disclaimer, the term of this patent is extended or adjusted under 35 U.S.C. 154(b) by 0 days.

(21) Appl. No.: 09/509,507

(22) PCT Filed: Sep. 30, 1998

(86) PCT No.: PCT/GB98/02936

§ 371 (c)(1), (2), (4) Date: May 30, 2000

(87) PCT Pub. No.: WO99/17260

PCT Pub. Date: Apr. 8, 1999

(30) Foreign Application Priority Data

Sep. 30, 1997 (GB) .............................................. 9720741
Apr. 7, 1998 (GB) .............................................. 9807483
Aug. 5, 1998 (GB) .............................................. 9817057

(51) Int. Cl.[7] .............................................. G06K 9/00
(52) U.S. Cl. .............................................. 382/100
(58) Field of Search .............................. 382/100, 135, 382/137, 141, 249; 235/435, 462.01

(56) References Cited

U.S. PATENT DOCUMENTS 4,628,468 A 12/1986 Thompson et al.
4,668,597 A 5/1987 Merchant
4,892,385 A 1/1990 Webster, Jr. et al.
4,941,193 A 7/1990 Barnsley et al.
5,354,593 A 10/1994 Grandmont et al.
5,548,110 A * 8/1996 Storch et al. .......... 235/462.07
5,557,412 A * 9/1996 Saito et al. ................. 358/296
5,592,561 A * 1/1997 Moore ......................... 382/103
5,698,833 A * 12/1997 Skinger ................. 235/462.09
5,768,437 A * 6/1998 Monro et al. ............... 382/249

FOREIGN PATENT DOCUMENTS

DE 2943436 A1 5/1981
EP 0294122 A1 12/1988
EP 0620673 A1 10/1994
EP 0660275 A2 6/1995
EP 0733995 A1 9/1996

OTHER PUBLICATIONS

"Counterfeit deterrent features for the next–generation currency design", Committee on Next–Generation Currency Design, Publication NMAB–472, National Academy Press 1993, pp. 61–67.*

* cited by examiner

*Primary Examiner*—Leo Boudreau
*Assistant Examiner*—Tom Y. Lu
(74) *Attorney, Agent, or Firm*—Arnold B. Silverman; Eckert Seamans Cherin & Mellott, LLC

(57) ABSTRACT

Anti-counterfeiting marking for documents, which marking may be disguised as an incidental or artistic feature of overall marking on the documents is adapted to be read by a complementary reading device. In one embodiment the marking may be a one, two or three-dimensional statistically fractal marking and is representative of an array of digits in which the value of each digit is represented by the fractal dimensions over a corresponding region or set of regions of the document bearing the marking. Corresponding apparatus for reading the anti-corresponding marking is also provided.

7 Claims, 4 Drawing Sheets

Errors for 64 samples; Low=1.1, High=1.9

ANTI-COUNTERFEITING AND DIFFUSIVE SCREENS

BACKGROUND OF THE INVENTION

1. Field of the Invention

THIS INVENTION relates to measures for combating counterfeiting, particularly counterfeiting of banknotes and like documents, but also counterfeiting of other items such as packaging for perfumes, drugs, spirits, wine, CDs, CD ROM disks, records, tapes, etc., and the packaging therefor.

2. Description of the Related Art

There are many and various ways of making it difficult for counterfeiters to produce counterfeit banknotes which will escape detection by experts scrutinizing the counterfeit notes closely, but it is a fact well known to counterfeiters that the majority of people handling banknotes and other products do not scrutinize these carefully and, for the most part, do not have the expertise necessary to detect forgeries, even after such close scrutiny. Accordingly, there is a demand for some means which would allow ordinary individuals, without undue effort, to detect counterfeit notes reliably. Various proposals have been made to this end and, indeed, devices purporting to fulfil this requirement are available, for example devices which rely upon fluorescence under ultra-violet light, and devices in the form of marker pens which apply a fluid which can undergo a colour change, due to chemical reaction, but these known expedients are unreliable in that they may both indicate genuine notes as being counterfeit and may fail to detect counterfeits, particularly since counterfeiters have become aware of these expedients and select or treat the materials they use accordingly.

One difficulty with conventional security markings, for example, serial numbers or bar codes, is that the fact that they are security markings is plainly evident on even a casual inspection so that forgers will naturally exercise care to reproduce such markings accurately.

SUMMARY OF THE INVENTION

It is an object of the present invention to provide an anti-counterfeiting marking which can effectively be camouflaged and which yet will allow of verification automatically without requiring skill or the expenditure of undue time by the user.

According to a first aspect of the invention there is provided anti-counterfeiting marking for items such as banknotes and like documents, which marking is disguised as an incidental or artistic feature of overall marking on the banknotes or like documents, but is adapted to be read by a complementary reading device.

In preferred embodiments of the invention, said marking is a one, two or three-dimensional statistically fractal marking. This marking may be combined with, or incorporate, a regular or miniaturised routine bar bode providing details of the product.

Preferably, in this case, the marking is statistically fractal and is representative of an array of digits in which the value of each digit is represented by the fractal dimension, as herein defined, over a corresponding region, or set of regions of the area of a product, e.g. a banknote or like document such as a label bearing the marking.

Random scaling fractal fields look natural, because fractal geometry is based on fundamental characteristics of nature and possesses self-affinity. In particular, random scaling fractal signals are statistically self-affine, i.e. the statistics of the signals are invariant of scale.

In addition to the advantage of unobtrusiveness, the fractal code marking proposed in accordance with the preferred embodiment of the invention lends itself to the provision of redundancy of the coding information, so that, for example, a banknote which has become damaged or defaced can still have its code marking read to a high level of reliability.

According to a second aspect of the invention, there is provided an apparatus for reading an anti-counterfeiting marking according to the first aspect of the invention, including light sensing means for determining the relative density (darkness or lightness) of each elemental area in a set of elemental areas occupying predetermined positions within, and with respect to, a notional window in the area of such marking and means for deriving from the densities so determined a numerical value statistically representative of said set, said apparatus being adapted to conduct a scan of said window over the area of said marking and to determine such a value for each of a plurality of reference positions of such window within such scan, and means to determine from said values a corresponding indicator or string, such as a number or text, the apparatus further including means for displaying the last-noted number or text or for comparing it, for validation purposes with a predetermined string/indicator.

In one embodiment of the invention, said predetermined positions are successive positions in a linear series of such positions and the apparatus is adapted to scan said window along a line parallel with a notional line along which said predetermined positions are disposed.

By way of example, successive said reference positions of said window may, in this case, be such that the elemental area of the document scanned which is disposed in a said predetermined position in said window in one such reference position is the elemental area which was disposed in the succeeding said predetermined position in said series, in the preceding reference position in said scan, so that each said elemental area, in the course of such scanning, contributes to a succession of said values.

In a further development, the apparatus may be adapted to effect a raster scan of the coded area of the banknote or other document, with each line of the raster being treated as a respective linear scan.

Where, as is preferred, the coded area of the banknote or the like is statistically fractal, the apparatus is preferably arranged to calculate said values as at least approximately the fractal dimension, as defined in document D1, of the portion of the marking within said window.

The reader may be equipped to read other encoded information such as a routine bar code.

The fractal encoding/decoding system in accordance with the invention may utilise the techniques and principles disclosed in more detail in Blackledge J. M., Foxon B., and Mikhailov S., *Fractal Dimension Segmentation*, published by SERCentre, De Montfort University, Leicester (Research Monograph No. 12, September 1996) and in *Image Processing: Mathematical Methods, Algorithms, and Applications* (Ed. J. M. Blackledge) Oxford University Press, 1997, pp. 249–292. The last-noted document is herein referred to, for convenience, as document D1.

With the contemplated coding arrangement in accordance with the invention, key management is not necessary, provided that the fractal code marking is not recognised for what it is.

It is among the objects of the present invention to provide an anti-counterfeiting means which will provide reliable detection of counterfeit notes without requiring skill or the expenditure of undue time by the user.

According to a third aspect of the invention there is provided apparatus for use in detecting counterfeit items, for example for detecting counterfeit banknotes or the like documents, which carry code markings conforming to any of a large but limited number of combinations and/or permutations of such code markings provided on genuine items among a significantly larger number of possible combinations and/or permutations of such markings, the apparatus including means for reading such code markings, means for storing a record of valid marking combinations and/or permutations, and means for comparing the code markings read with said record to determine whether or not a particular code marking read is a valid one and to provide an audible or visible indication of the determination reached.

According to a fourth aspect of the invention, unconnected with anti-counterfeiting measures, (or at least not necessarily connected with such), there is provided a mask suitable for use in the production of a light-diffusing screen using a photopolymer, the mask comprising an opaque layer or coating having an array of light transmitting apertures or windows therein, and wherein said apertures or windows are of at least three different sizes and/or shapes.

According to a fifth aspect of the invention, there is provided a method of making a light-diffusing screen comprising superimposing a mask according to the last-noted aspect on a layer of a photopolymerisable material or a layer of otherwise photo-modifiable material and exposing said layer to light through said mask.

According to another aspect of the invention, therefore, there is provided anti-counterfeiting means for items, such as banknotes and like documents, comprising a coded array of markings readable by a complementary reading device.

According to a still further aspect of the invention there is provided an anti-counterfeiting or anti-copying means for media bearing sound or video recordings, computer data or the like such as, for example, compact discs (herein referred to as CDs) or tape cassettes or magnetic discs (diskettes) bearing sound recordings or computer software, in which the recording itself, or alternatively a decoding key or algorithm, is embodied in the recording, or alternatively, or additionally, in a visible or otherwise readable fractal marking on the recording medium itself.

BRIEF DESCRIPTION OF THE DRAWINGS

Embodiments of the invention are described below by way of example with reference to the accompanying figures, in which.

DESCRIPTION OF THE PREFERRED EMBODIMENTS

Figure 3:
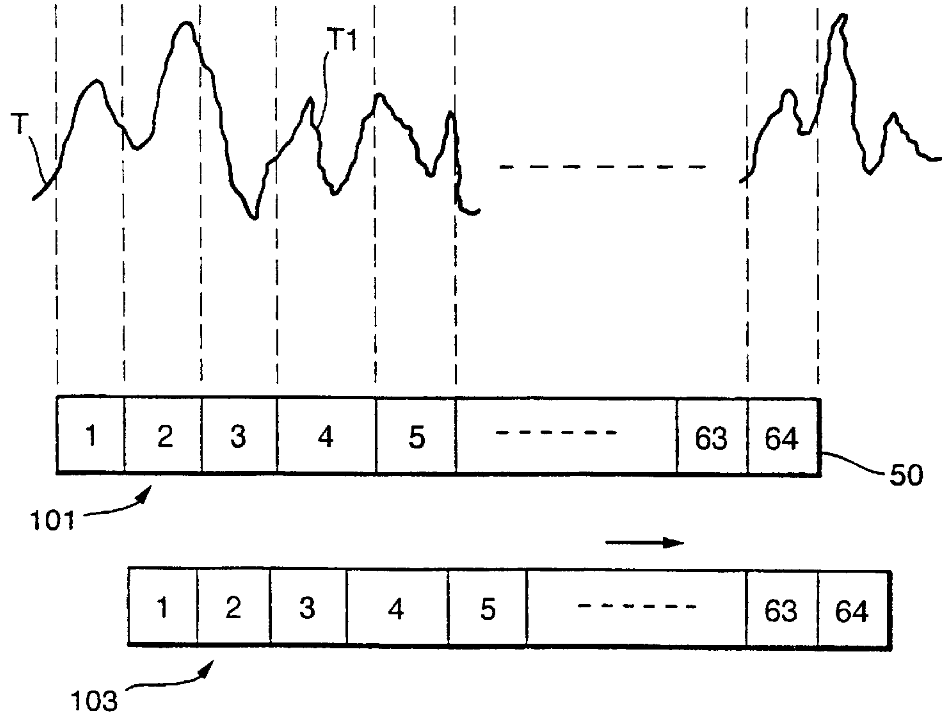
FIG. 3 is a schematic illustration of the operation of a reading apparatus in accordance with the invention.

Referring to FIG. 3, the graph D represents the variation of print density (darkness or lightness), plotted along the y-axis in terms of grey scale values, in a code-bearing area of a banknote or the like marked in accordance with the invention, with position along a predetermined imaginary straight line across the banknote or the like (such position being plotted along the X axis). The coded area of the banknote or the like, across which said imaginary line extends, is one which forms part of the printed image on the banknote or the like, (which may, for example, bear a portrait of the sovereign, or a reproduction of some other artwork), but which is not, on the scale concerned, determined closely by the nature of the printed image. For example, the coded or encrypted markings may extend over an area for which, from the viewpoint of the person viewing the document any of a variety of distributions of light and dark over that area would have equal validity. Thus, for example the area concerned may simply, from the artistic viewpoint, form shading, hatching or visual texturing, or generalised representation of background foliage, vegetation, clouds or the like, or other formations which are statistically fractal in nature.

Banknotes or other items coded in accordance with the present invention are adapted to be checked or validated by means of associated note readers or other apparatus, arranged to execute a decoding algorithm by means of which the serial number or other information encoded in the marking can be decoded and recovered.

In FIG. 3, the elongate rectangular area represented at 50 represents a window defined by a reading apparatus (not shown) engaged in reading the portion of the coded area represented at T, and the smaller boxes within rectangle 50 and marked 1, 2, 3, . . . to 64 represent specific sensing locations or positions, herein referred to, for simplicity, as "boxes", within that rectangle 50. The reference 101 indicates a first position (referred to herein for convenience as a "reference position" of window 50 on the marking represented by trace T.

In operation of the apparatus, the apparatus senses the print density (represented by the height of the trace T immediately above the respective box 1, 2, 3, etc.) of the region in the window 50 covered by the respective box and derives for that density a respective grey-scale numerical value. The apparatus is arranged to carry out a predetermined algorithm, for example as defined in document D1, to derive, from these values for all of boxes 1 to 64, an end value which is statistical in the sense that it is dependent on the values for each of boxes 1 to 64. The algorithm concerned might, for example, be such as to calculate said end value as the arithmetic mean of the "box" values for all the boxes in window 50 or the root mean square deviation of these "box" values from such mean, if a complementary code marking were employed. However, such a code marking would be too readily apparent to the human eye, and accordingly it is preferred to utilise the fractal dimension "D", as defined in document D1, as the bearer of the coding information, so that the "end value" calculated by the apparatus, in accordance with the algorithm used, from the "box" values is likewise the fractal dimension D. In operation, once the apparatus has calculated the "fractal dimension" for one position (indicated at 101 in FIG. 3) of the window 50 relative to the marking represented by trace T, the window 50 is subsequently displaced to the right (in the illustration in FIG. 3) by the length of one box 1, 2, 3, etc., to a second "reference" position indicated at 103 in FIG. 3, so that the "box value" for box 1 becomes the value which was previously the box value for box 2, the "box value" for box 2 becomes the value which was previously the box value for box 3, and so on, whereby the "box value" for box 63 becomes that which was previously the "box value" for box 64 whilst box 64 has a new "box value". The fractal dimension D is re-calculated for this new position of the window, after which the window is again displaced by one box length, the fractal dimension re-calculated, and so on.

It is contemplated that, in practice, the reading or validation apparatus used will be a relatively compact electronic apparatus, which may, for example, include a frame or holder for the note to be checked and with appropriate means for illuminating at least the relevant portion of the note and for effecting the above-mentioned "scanning" along the appropriate notional line across the note. Such scanning may be effected mechanically or electrically. The decoding algorithm may be, for example, a unique algorithm incorporated in a secure microchip available, for example, on a licensing or hire basis, from the central bank or other issuing authority.

Figure 1:
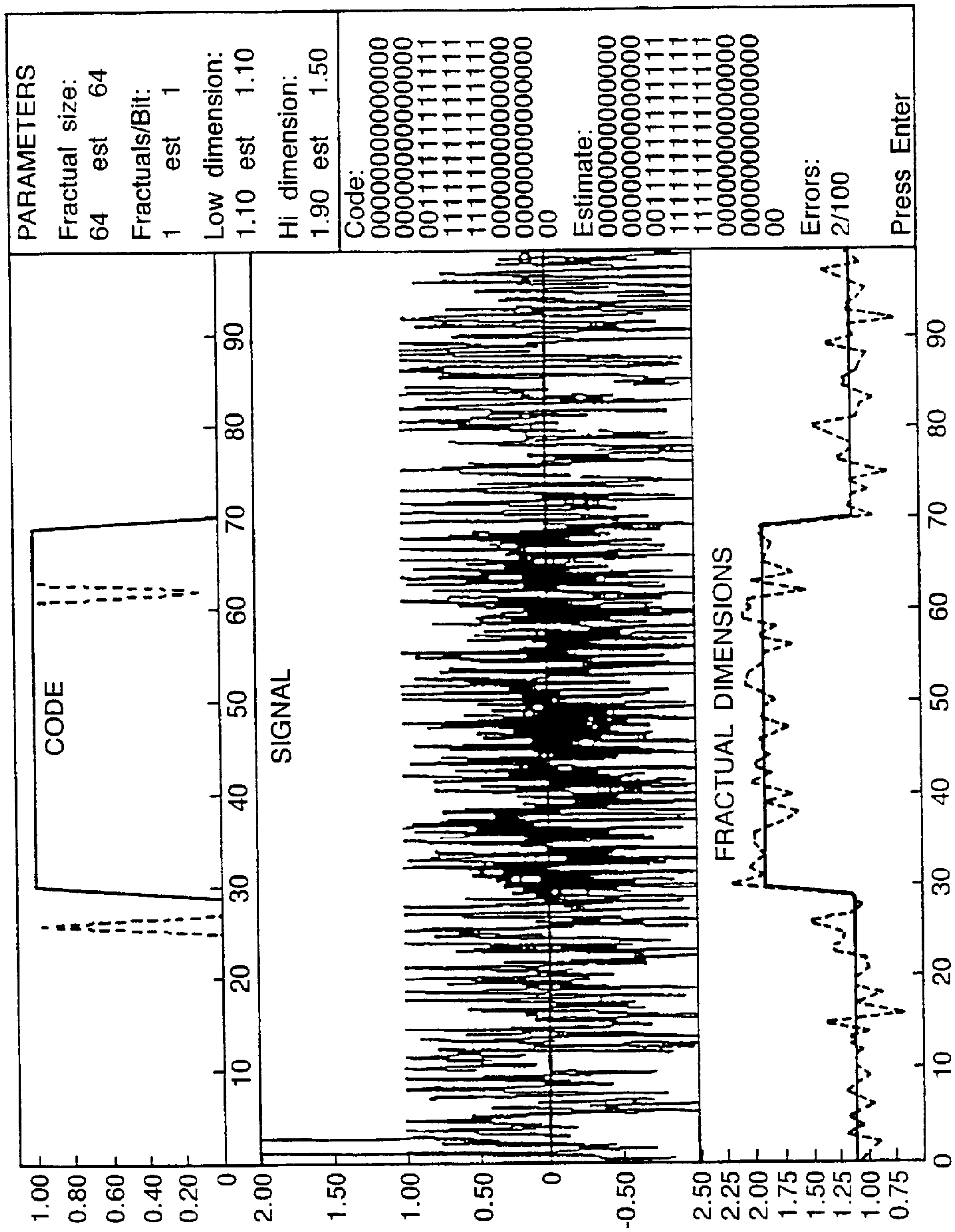
FIG. 1 is a composite graph, in which the central graph is a trace of optical (print) density (plotted along the y-axis) against position along an appropriate straight line traced along the banknote or the like bearing the code marking, the lowermost trace illustrates the corresponding variation in fractal dimension along that line, and the uppermost trace illustrates the result of further processing to derive the appropriate digital signal from the lowermost trace.
Figure 2:
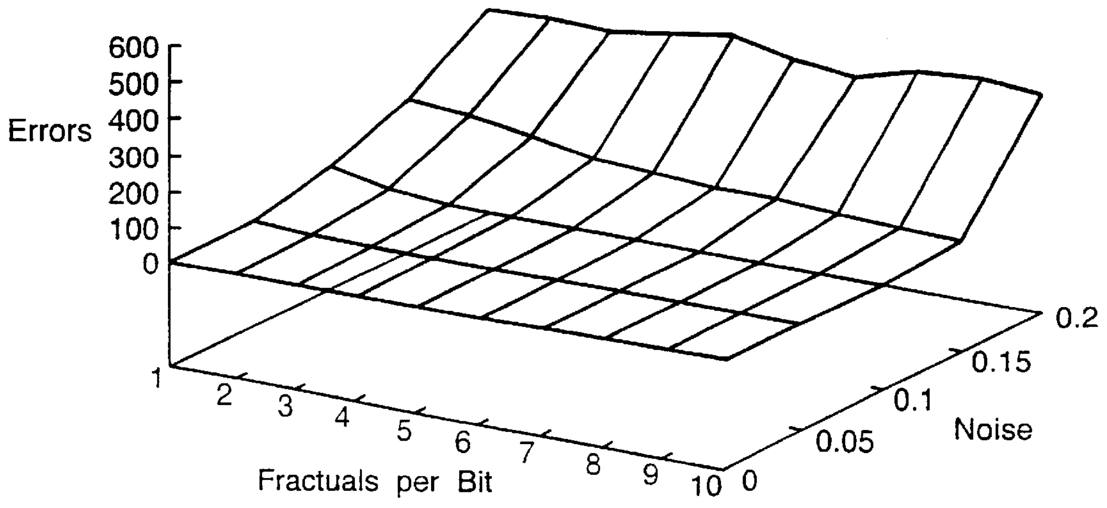
FIG. 2 is a three dimensional graph illustrating the bit code error as a function of the number of fractals per bit and the noise level.

Referring to FIG. 1, the lowermost graph represents, in broken lines, the variations in the fractal dimension D so calculated, (plotted on the y-axis) with the "reference position" of the window (plotted on the x-axis) as the window 50 is scanned in the manner indicated along said line through the coded region. The broken line in the lowermost graph conforms, with minor and random departures, (due to "noise"), with the digital or "pulse" waveform illustrated in solid lines in the lowermost graph and which corresponds to the "bar-code" carried in encrypted form in the marking represented by trace T.

There is set out below, by way of further explanation, a more formal analysis of the fractal coding arrangement and decoding procedure preferably utilised in accordance with the invention. As in the above description with reference to FIGS. 1 and 3, this analysis considers, by way of example, a barcode-like digital indicator (referred to below as "B-code") subjected to fractal modulation.

The term F-coding is used herein to denote fractal coding in accordance with the invention.

The fundamental model for such modulation, (based on fractional differentiation) is discussed in more detail below.

Consider the equation $$\frac{d^{q(x)}}{dx^{q(x)}} f(x) = n(x)$$

where n(x)—White Gaussian Noise f(x)—Fractal Signal and

1<q(x) 2—Fractal Dimension.

Let B-code be described by q(x)—fractal modulation.

Then two problems arise, namely:

(i) the Forward Problem (F-coding): i.e. given q(x), to compute f(x).

(ii) the Inverse Problem (F-decoding): i.e. given f(x) to compute q(x).

F-coding

Let q(x) represent bar code, e.g.

$$q(x) = \begin{matrix} q_{\min}(\equiv 0), & x \in [0, a] \\ q_{\max}(\equiv 1), & x \in [a, b] \\ q_{\min}(\equiv 0), & x \in [b, c] \\ q_{\max}(\equiv 1), & x \in [c, d] \\ \vdots & \vdots \end{matrix}$$

then to effect fractal modulation, compute $$\begin{matrix} f_1(x), x \in [0, a] \\ f_2(x), x \in [a, b] \\ f_3(x), x \in [b, c] \\ f_4(x), x \in [c, d] \\ \vdots \end{matrix}$$

and concatenate fractal signals $f_1$, $f_2$, $f_3$, $f_4$, . . . to form F-code.

F-Decoding Fractal Dimension Segmentation

Apply a moving window to F-code.

Compute $q_1$, $q_2$, $q_3$ . . . for each position of window 1, 2, 3, . . . to form the basis of Fractal Dimension Segmentation.

Reconstruction of the original B-code B may be effected using an algorithm, such as defined in document D1 together with the following procedure:

If $q_i \leqq \Delta$ then B=0.

If $q_i > \Delta$ then B=1.

where $q_i$ is the value, for a given x-axis value i, in the lowermost graph in FIGS. 1 to 6, of the varying quantity represented by the broken lines, and $$\Delta = q_{\max} + \frac{q_{\max} - q_{\min}}{2}$$

($q_{max}$ and $q_{min}$ being respectively the maximum and minimum values on the graph marked in broken lines in the lowermost parts of FIGS. 1 to 6).

The uppermost graph in FIG. 1 illustrates, in the broken line, the value of B derived in accordance with the last-noted algorithm, whilst the solid line indicates the true B-code digital value. The departures of the "raw" broken line, graph from this true B-code graph represent noise-induced errors, which in practice are filtered out on the basis of their length/duration by processing techniques known per se.

As a principal criterion for "good" F-coding, i.e. such as to render it unobtrusive, it is appropriate to minimise Δ in the above equation, subject to accurate reconstruction of B-codes in the presence of additive noise.

Examples of Results

The accompanying figures illustrate results obtained using examples of fractal modulation coding in accordance with the invention. These results are based on a software system developed to test F-coding. The system has been designed with options on:

(i) fractal size, i.e. the number of line elements used to compute a fractal signal.

(ii) fractals per bit, i.e. the number of fractal signals used to represent one bit (after concatenation). (The term "fractals per bit" simply relates to the amount of information used to describe a single bit, for example, 1 fractal/bit=64 elements; 2 fractals/bit=128 elements; 5 fractals/bit=5×64 elements and so on). The fractals it is proposed to use in this context are, it will be understood, of the sort in which we do not have, on any scale, a precisely repeating pattern, each repeat of which forms an element of the same pattern on a larger scale, but rather are markings which are fractal in a "statistical" sense.

(iii) numerical values applied to $q_{min}$ and $q_{max}$, (iv) addition of "white gaussian" noise before reconstruction (to test the robustness of the technique).

The results summarised in the accompanying figures illustrate that the fractal modulation and F-coding technique proposed in accordance with the invention works. The error rate in F-decoding depends on the additive noise (occasioned, for example, by incidental markings and damage on banknotes). F-decoding is robust for noise levels up to 20%.

It is believed that the fractal coding system in accordance With the invention will help to keep central banks ahead of forgers in the technology race. The system may also be used to provide a covert security system for other printed material associated with high value items such as tickets, perfumes, alcoholic drinks, passports, driving licences, etc. and also to provide authentication for such products as pharmaceuticals, aircraft parts, car parts, baby foods etc.

Whilst, for simplicity, a one-dimensional linear encoding arrangement has been discussed above (and a correspondingly linear, one-dimensional scanning procedure described) it will be understood that the code marking may comprise density variations along two mutually perpendicular axes on the surface of a banknote or the like and that the scanning effected by the reading apparatus may be contrived accordingly. Indeed using sophisticated three-dimensional imaging techniques, such as holographic techniques, it is contemplated that the code marking may comprise density variations along three mutually perpendicular axes, two on the surface of a banknote or the like and the third being, in effect, a "virtual" dimension perpendicular to the surface of the banknote or the like, with the scanning being effected by scanning apparatus of complementary sophistication.

Embodiments of the invention in accordance with the third aspect referred to above are described below in greater detail.

In an anti-counterfeiting system utilising the present invention, it is contemplated that banknotes will be produced having a code marking in the form of an array of markings adapted for reading by the device referred to below. The markings are preferably invisible, or at least unreadable by the naked eye or by conventional optical instruments. For example, markings may be microscopically small and/or may be visible only in light of a certain wavelength, and/or only in polarised light or only in coherent (e.g. laser) light.

Preferably the code marking is arranged as a series of parallel bar-like markings, similar in geometric arrangement to known bar-code markings, although not necessarily appearing similar to the naked eye since it is contemplated that the width of individual "bars" and the pitch between adjacent bars in such marking will be very small, e.g. of the order of 10 microns.

An apparatus for reading such a code marking on a bank note or the like may, for example, comprises a source of collimated light, for example a low power laser such as employed in CD players, for directing a beam of collimated light onto such marking, a light receptor for receiving light reflected from such marking, electronic processing means for deriving from the electrical signals from said receptor a number representative of the particular code marking read, means for storing a list of predetermined valid code markings, means for comparing a code marking read with the code markings on said list to determine whether the marking read is a valid marking or not and indicator means, for example light sources visible to the user, such as red and green LEDs, for indicating the result of such comparison, i.e. for indicating whether the note, the marking of which has been read, is a genuine note or a forgery.

It is contemplated that the reading device may conveniently take the form of a pen which can be "swiped" along the code marking snip on banknotes, the body of the pen incorporating the necessary electronic circuitry, or, alternatively, being connected by a cable with a separate casing incorporating the necessary circuitry. The code marking is preferably arranged in a repeating sequence over the respective region of the banknote, so that it can be read without accurate placement of the "pen" swiped along the marking. It is further contemplated that the reading device, or the part thereof containing the circuitry embodying the predetermined codes, would be provided by, for example, the official body printing or issuing the banknotes, that the predetermined codes themselves would be kept a closely guarded secret and that the apparatus would be arranged to self-destruct or otherwise to destroy the stored codes in the event of any attempt being made to open the apparatus, or the respective part of the apparatus, or to interrogate or otherwise investigate the apparatus electronically or by other means to obtain the valid code numbers.

Alternatively, the code marking may be associated with the serial number appearing on a banknote in such a way that the appropriate code marking is derived, through a highly complex algorithm, from the serial number, there being a large number of possible valid code markings, (although possibly significantly less than the number of possible serial numbers). The counterfeit testing apparatus, in this case, may include a facility for entering the serial number of a note to be tested and the circuitry arranged to calculate from the serial number the appropriate code marking and to check whether the actual code marking does indeed correspond with that, in which case the note will be passed as genuine or does not so correspond, in which case the note will be rejected as a forgery. In this variant, the last-noted circuitry, at least, is incorporated in a part of the apparatus arranged to self-destruct or otherwise to destroy all trace of the respective algorithm in the event of any attempt being made to open the apparatus, or the respective part of the apparatus, or to interrogate or otherwise investigate the apparatus electronically or by other means to obtain the valid code numbers.

Conveniently, the code marking is applied to a metallic tape or thread incorporated in the banknote, in manner known per se, for example in a repeating sequence of markings along such tape, the metallic tape or thread being exposed at intervals along the note, so that the reading device "pen" must be swiped along the region of such tape or thread on the note. The surface of such tape or thread may be made substantially more smooth and regular, on a microscopic scale than the paper of the banknote, and thus more suited to bear a microscopic code marking.

Alternatively the code marking may be applied to a patch or panel, for example of plastics or metal foil bonded to, or preferably incorporated in, a banknote or other item. Such patch or panel may, for example, comprise an array of microscopic pits readable by laser in much the same way as digital compact discs and incorporating the respective verification or authentication code.

Whilst the invention has been described above primarily in relation to combatting counterfeiting of banknotes, it will be appreciated that the invention may be used to combat counterfeiting of any other document such as lottery tickets, theatre tickets or tickets for football matches, or, indeed, other products.

Thus, for example, the marking scheme described may be applied to products such as medicaments, drugs or perfumes, the counterfeiting of which is becoming increasingly prevalent. In such application, the coding may be applied to the packaging of such products, for example to sachets, etc. used in the compartmented packaging for medicaments or drugs. It is contemplated that coded marking in accordance with the present invention may be applied directly to, for example, tablets incorporating drugs or to gelatine capsules containing drugs, the marking material in such cases being selected so as to be innocuous and either being digestible or being applied to only part of the tablet or capsule.

Marking in accordance with the invention might also be applied directly to other products susceptible to counterfeiting, such as tape cassettes, CDs, floppy disks etc. bearing sound or video recordings or computer software.

A similar technique, involving the coding of a "thread" or tape, may be applied to the packaging of products, for example, the packaging of drugs or perfumes, by providing such coding on a tear-strip or reinforcing strip visibly incorporated in such packaging, whereby the authenticity of the product can be checked by scanning the appropriate apparatus along the tear strip or reinforcing strip.

In a further variant, the code markings may be in the form of a computer-generated pseudo-random array of spots or patches, preferably on a microscopic scale, readable by a computer-based verification device utilising software related to the software used for generation of the pseudo-random array. Thus, the code marking may be stochastic or pseudo-stochastic in character. In any of the arrangements described, the code-marking may be binary in nature, in the sense that potential locations of spots, patches or other markings are predetermined, for example as locations in a stochastic or pseudo-stochastic array, and that in any particular code marking, selected said locations are occupied by respective spots, patches or other markings, whilst selected others are not. In such cases, the marking may be arranged to provide a very large number of binary "bits" for example many megabytes of code as the code marking of a single document, making counterfeiting extremely difficult.

The individual spots or patches in the random or pseudo-random array may be in the form of circles, ellipses, square, rectangles, elongate bars, or any other shape. In this valiant, the marking may be applied on a document-by-document basis by computer-controlled equipment utilising, for example, photographic or laser techniques, the computer controlled apparatus being controlled by appropriate software so as to follow a pseudo-stochastic process. Alternatively, batches of documents, for example, banknotes, may be marked with essentially the same pseudo-stochastic array by using optical printing techniques utilising a stochastic mask in turn configured by a computer controlled mechanism utilising appropriate software. Such mechanism may, for example, utilise an E-beam device to form apertures disposed to form a pseudo-stochastic array in a mask, (for example, in a chrome layer on a glass substrate).

By way of example, an optical printing technique using such a mask may be utilised to expose selectively a photo-polymerisable layer upon a document or packaging, to bring about selective polymerisation which, possibly after a developing step, will result in markings readable by an appropriate verification device such as envisaged above. A similar technique may be utilised to produce a desired marking or marking array using a photochromic or photographic medium, for example, incorporated in the document concerned. Alternatively, such a mask may be used in the same way as in a conventional photographic half-tone negative to produce, by a photolithographic or photogravure technique, a printing plate to be used, with or without other printing plates, in printing the documents concerned, be they bank notes, certificates or the like documents, labels, packaging or whatever. In any event, it is generally preferable that the code marking is such as to be substantially unnoticeable, in the sense that to a human visual inspection, the code marking is indistinguishable from other markings such as minor soiling, or natural irregularity or texture in the paper. The documents, notes, labels, packaging or whatever may, of course, (and indeed generally will) have other marking, by way of decoration, print and even other marking, such as bar codes, intended to be read mechanically, to identify the product. The function of the coding in accordance with the invention may thus be primarily to provide a certification or authentication of the genuineness of the product, rather than, say, to distinguish one hopefully genuine) product from a different (hopefully genuine) product.

Thus, for example, in the case of a medium carrying a sound recording, the fractal marking may comprise an initial part of the recorded signal, so that, for example, in a compact disc bearing a recording of a musical performance, the first few seconds or fractions of a second of the total "playing time" may comprise, instead of a recording of the initial part of the performance in question, a recording which, when reproduced by the reproduction or playback apparatus concerned, (e.g. a CD player in the case of a CD) is a fractal acoustical or electrical signal corresponding, for example, to the central graph in FIG. 1 in which is encoded, in substantially the same manner as described in relation to these figures but in terms of a varying acoustical or electrical signal rather than varying in density along an imaginary line on a printed document or the like, the respective code. Because, where recorded sounds or video or computer software are concerned, the concern of the user is not so much the authenicity of the medium bearing the recording, but the content and quality of the recording, in the case of a sound recording or video recording, or the operability of the software, in the case of computer software, the particular form of the fractal marking scheme envisaged is preferably arranged to interact with detection means incorporated in the apparatus with which the medium concerned is to be used.

Thus, for example, in the case of compact discs, the entire recording, apart from a short preamble containing the fractal code or recording, may be encoded or "scrambled" with the key to decoding or unscrambling being contained in the fractal preamble, which ideally, in the case of a CD bearing an audio recording, might be in such a form as to sound like white noise if the CD is played by a conventional CD player. However, if played by a CD player incorporating an appropriate decoder for firstly detecting the encoded key from the fractal representation of the latter and secondly for decoding the recording using that key, then a faithful reproduction of the original musical performance or the like will result.

Alternatively, an entire musical performance or the like might be fractally encoded in a CD which, when reproduced by a conventional CD player would sound like a protracted period of noise, but when played in an appropriate player, (for example, playing at faster than standard speed to cope with the measure of extraneous matter implicit in a fractal encoding), would render a faithful reproduction of the musical performance or the like concerned. The latter expedient would be more viable in cases in which the recorded performance was of a duration much less than the theoretical recording capacity of the non-encoded medium, as is the case, for example, with CD "single" recordings of popular songs or the like. Similar considerations apply to computer software recorded on CDs where the theoretical capacity of the CD format is generally substantially greater than the size of any particular software package.

It will be understood that, in accordance with the invention, the above-noted provisions described with reference to CDs may also be applied to other recording and storage media, such as magnetic tape, floppy disks for computer use, the analogous digital magnetic discs for audio recording and so on.

The anti-copying scheme in accordance with this aspect of the invention also includes, of course, the complementary apparatus for de-coding the media concerned. Thus, it is envisaged that, in accordance with the invention, the apparatus reading and playing back the data or recordings carried on the fractally encoded media will incorporate decoding means including or consisting of a VLSI integrated circuit, containing the decoding and detecting algorithm and a means for decoding the "raw" signal derived directly from reading the medium, (e.g. CD, diskette or digital tape), the integrated circuit being so designed that interrogation of the circuit to determine the coding scheme is impossible or even being so designed as to provide false and misleading information upon such interrogation.

Thus, for example, a computer may incorporate such an integrated circuit in such a way that an attempt to load software carried on a counterfeit CD or floppy disk will fail because the circuit concerned will recognise that the necessary fractal coding is not present or is incorrect. Likewise, an audio CD or tape player incorporating such an integrated circuit may refuse to play a counterfeit recording because the integrated circuit will recognise the absence of the necessary fractal coding certifying that the CD, tape or the like concerned is genuine and not an illicit copy. However, where the software on genuine CDs, floppy disks, tapes or the like is encrypted in accordance with a key hidden in such fractal encoding, the computer need not make a positive response to the absence of the fractal encoding incorporating the encryption key. The mere absence of such a key will ensure that the computer cannot accept of the data carried on the CD or other carrier. The same considerations apply, of course, where the system is applied to sound reproduction, video reproduction or whatever.

As an additional, or even alternative anti-copying provision, fractal encoding may be incorporated in visual or magnetic marking on, for example, the "non-playing" side of a CD, with the complementary apparatus for "playing" or "reading" the CD having auxiliary means for reading such marking. The apparatus may simply be arranged to refuse to play or read a CD in which the appropriate fractal marking is absent or incorrect or an appropriate encryption key or decoding algorithm may be incorporated in such marking so that intelligible reading or playing of the CD will not be possible unless such fractal decoding is correctly and successfully decoded. Analogous arrangements may, of course, be used in analogous anti-copying schemes for other media such as magnetic tapes, diskettes, video tape, floppy disks etc.

As noted above, according to the fourth aspect of the invention, unconnected with anti-counterfeiting measures, (or at least not necessarily connected with such), there is provided a mask suitable for use in the production of a light-diffusing screen using a photopolymer, the mask comprising an opaque layer or coating having an array of light transmitting apertures or windows therein, and wherein said apertures or windows are of at least three different sizes and/or shapes.

Likewise, according to the fifth further aspect of the invention noted above, there is provided a method of making a light-diffusing screen comprising superimposing a mask according to the last-noted aspect on a layer of a photopolymerisable material or a layer of otherwise photo-modifiable material and exposing said layer to light through said mask.

The method may include appropriate subsequent development or processing steps to produce, ultimately, a light-diffusing screen having optical features corresponding to said apertures or windows.

By way of example, such a mask may be used to produce a light-diffusing screen incorporating graded refractive index features, by a method, similar to that disclosed in EP-0294122, in which a photopolymer layer having localised variations in refractive index is produced by exposure of a layer of an appropriate monomer to polymerising radiation through the mask, followed by a blanket exposure of the material to polymerise the previously unpolymerised, (or less polymerised), material.

As another example, such a mask may be used to produce a light-diffusing screen comprising an array of relief features in a light-transmitting polymer, such features being upstanding from a light-transmitting substrate, by a process comprising providing a transparent substrate having a photopolymerisable layer thereon, selectively exposing regions of said layer by superimposing such mask on the laminate and directing light of an appropriate wavelength through said mask onto the photopolymerisable layer to polymerise the portions of the layer so exposed, subsequently removing the mask and processing the laminate to remove the unpolymerised regions.

Thus, in one embodiment, the mask may be formed by providing, for example, a glass sheet having on one surface a layer of metallic chrome, and the chrome may be removed in selected regions to form the desired light-transmitting windows. Such removal of the chrome may be effected using conventional photo-etching techniques, e.g. using a corresponding photographic positive or negative silver halide plate to expose a photo-resist applied over the chrome layer, "developing" the exposed resist layer to wash away the exposed or unexposed (depending upon the nature of the photoresist used) material, to expose the chrome layer in corresponding selected regions and then etching away the positions of the chrome layer exposed through the photoresist. Alternatively, the chrome may be removed in the desired regions by an E-beam device, as noted above.

The precise location and peripheral shape and size of each such window in the chrome layer may be determined by a computer controlling an apparatus in which, for example, a photographic plate intended to form a photographic "master" for such glass/chrome mask is traversed, under the control of a computer, along two perpendicular axes in its plane, below an image projection device, for example, a laser-based device, which can be operated, under the control of a computer, to form, at a predetermined position in the plane of the photographic plate, an image of a single desired aperture or window. The image projection device is operable to project any one of a plurality, preferably three or more, of different aperture or window images. The apparatus thus may be caused to expose the photographic master, window/aperture by window/aperture and to index the plate transversely and/or longitudinally between successive exposures to form, finally, upon the photographic plate, a two-dimensional array of a large number of such exposed regions. The conversion of such array of exposed regions to a corresponding array of apertures or windows in the chrome mask is, of course, carried out by a conventional photographic and etching technique which will not be detailed here.

Figure 4:
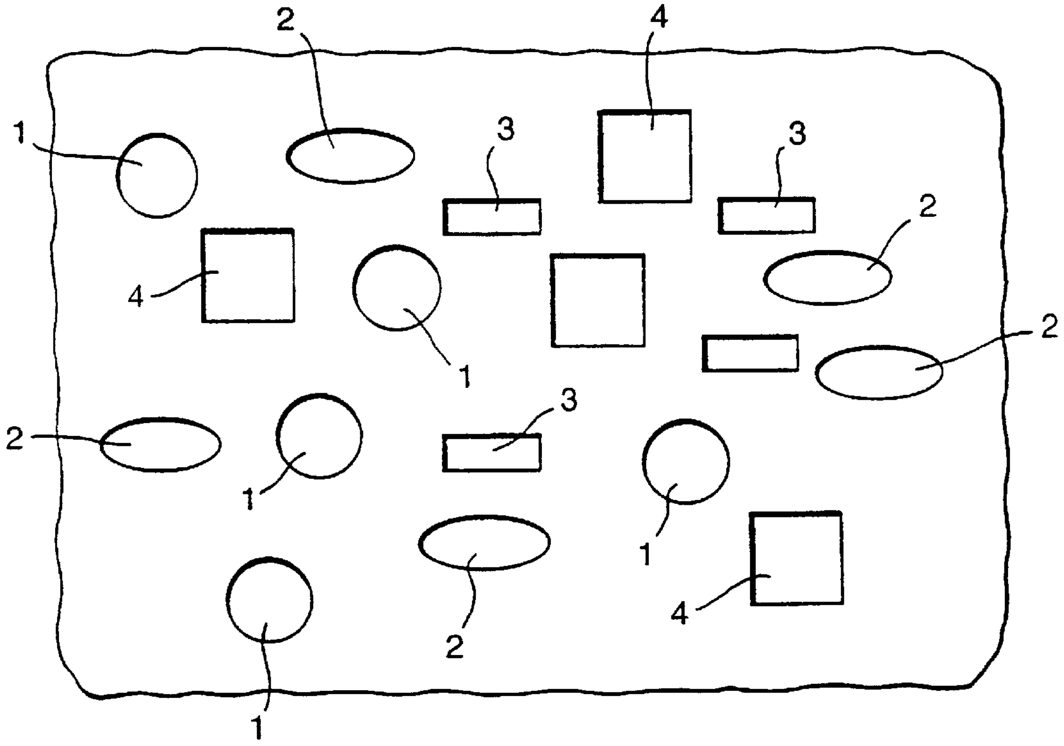
FIG. 4 is a schematic plan view of part of a stochastic mask which may be used in carrying out the invention in its fourth and fifth aspects.

FIG. 4 illustrates schematically a preferred form of mask produced by either technique. The mask comprises an array or distribution of apertures of at least three sets, (such a set comprising apertures of identical size and shape), distributed over the plate in a random or pseudo-random distribution, (referred to herein as stochastic) in which the apertures of said sets are randomly or pseudo-randomly interspersed. In practice, the computer controlling the generation of the mask is programmed to select the precise location and "set" of each aperture according to a predetermined algorithm, so that, for example, each apertuwe has a position of which the X and Y coordinates correspond with basic X and Y coordinates in accordance with a simple predetermined grid, plus or minus a respective random or pseudo-random X-offset and Y-offset, with the "set" selected for each aperture being likewise randomly or pseudo-randomly selected.

FIG. 4 illustrates one aperture each of four sets, indicated at 1, 2, 3 and 4, apertures 1 being circular, apertures 2 elliptical, apertures 3 rectangular and apertures 4 square. It will be appreciated that, in practice, the individual apertures are very small, for example 50 microns across or less, and present in very large numbers, with a typical spacing between adjacent apertures of 25 microns or less. The apertures of the different sets need not be of the precise shapes illustrated, of course. Indeed, for example, all of the apertures may be of the same shape, with the different "sets" being characterised by different sizes, or may all be of the same size with the apertures of different sets being of different shapes, or may be characterised by variations in both these factors.

Figure 5:
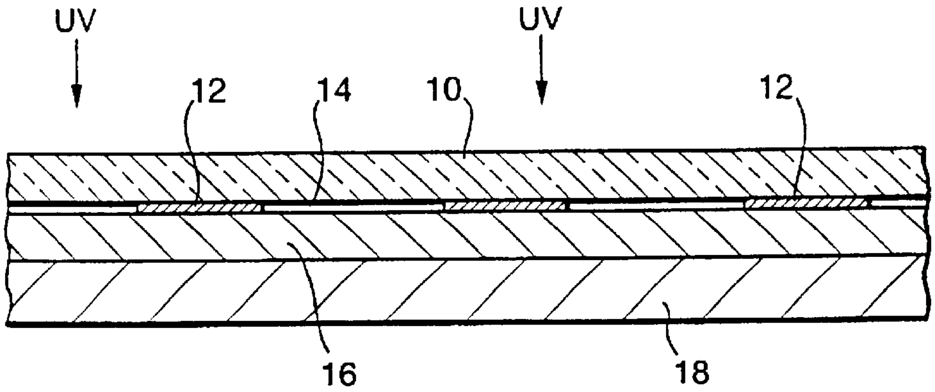
FIGS. 5 and 6 are schematic cross-sectional views illustrating stages in production of a diffusion screen in accordance with the invention in its fourth and fifth aspects.
Figure 6:
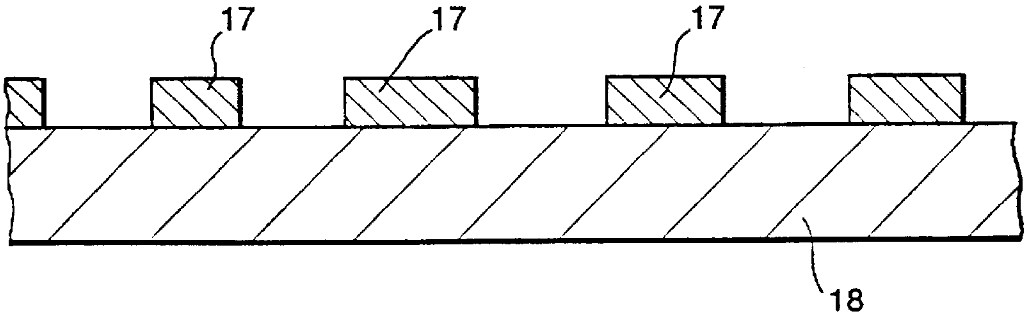
Figure 7:
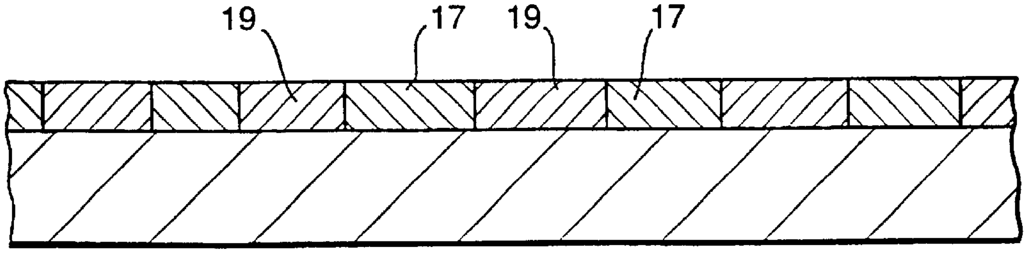
FIG. 7 is a schematic cross-sectional view illustrating an optional additional stage.

FIGS. 5 to 7 illustrate successive stages in one process for producing such a light-diffusing screen using such a stochastic mask.

Thus FIG. 5 is a schematic view in section perpendicular to the plane of the mask and the underlying layers, the glass plate being indicated at 10, the chrome layer at 12, and an aperture or window in that layer at 14. The chrome layer directly contacts a layer 16 of a photopolymerisable light-transmitting resin or monomer supported on a transparent substrate 18. Exposure of the regions of the monomer under window 10 by ultraviolet light directed through the mask polymerises the regions of the layer 16 under the aperture 14, leaving the remainder unpolymerised. After removal of the mask from the polymer/substrate laminate, the latter is subjected to a developing step, known per se, in which, as illustrated in FIG. 6, the unexposed material 16 is washed away, leaving upstanding patches or blocks 17 of the polymerised material, corresponding to the apertures 14 to which they were exposed. As illustrated in FIG. 7, the regions between such relief patches or blocks 17 can be filled with a black or dark plastics material 19, (for example applied initially in a liquid form and subsequently allowed or caused to harden or set), to produce a "black" or "tinted" screen, suitable for use, for example, as a rear projection screen with enhanced contrast (due to the reduced reflection of ambient light).

A light-diffusing screen produced as described may be used as a rear projection screen, or as a depixelating screen, that is to say as a screen adapted to be placed slightly in front of a pixelated LCD screen or other display characterised by a plurality of discrete pixels, (or by a raster of parallel lines) to remove or alleviate the perception of such pixels or lines. In use as a depixelating screen or as a rear projection screen to receive an image having spatially regularly occurring features, such as an image of a pixelated or a raster-scanned display, a light-diffusing screen produced as described, because of the random or stochastic aspect of the array of features, has the advantage of avoiding the disturbing Moiré effects encountered in such applications where a diffusing screen formed as a regular array of grooves or microlenses, for example, is used.

In the context of depixelating screens for pixelated displays, such as LCD displays, screens produced as described above are very efficient in terms of utilisation of the light available, as they additionally act as light collimators to increase the percentage of the light from the display which is emitted in the direction of the viewer. Additionally, by arranging for all of the apertures or windows in the "master" (e.g. in the chrome layer on the glass plate) to be elongate in the same direction, so that, for example, the apertures may take the form of rectangles and ellipses having their longer dimensions parallel with the X axis in the plate, such screen may be made to have asymmetrical diffusing properties, e.g. to disperse light more widely in a plane perpendicular to the plate and parallel with the Y axis than in a plane perpendicular to the plate and parallel with the X axis (and so perpendicular to the Y axis).

What is claimed is:

1. Anti-counterfeiting marking for documents, which marking is disguised as an incidental or artistic feature of overall marking on the documents, but is adapted to be read by a complementary reading device, said marking is a one, two or three-dimensional statistically fractal marking, and said marking is representative of an array of digits in which the value of each digit is represented by the fractal dimensions over a corresponding region, or set of regions of the area of a document bearing the marking.

2. A document, label or packaging carrying an anti-counterfeiting marking according to claim 1.

3. Apparatus of reading an anti-counterfeiting marking according to claim 1, including light sensing means for determining the relative density of each elemental area in a set of elemental areas occupying predetermined positions within, and with respect to, a notional window in the area of such marking and means for deriving from the densities so determined a numerical value statistically representative of said set, said apparatus including scanning means adapted to conduct a scan of said window over the area of said marking and to determine such a value for each of a plurality of reference positions of such window within such scan, and means to determine from said values a corresponding indicator or string, the apparatus further including means for displaying the last-noted number or text or for comparing it, for validation purposes with predetermined string or indicator.

4. Apparatus for reading an anti-counterfeiting marking according to claim 1 in which the apparatus is adapted to effect a raster scan of the coded area of the item, with each line of the raster being treated as a respective linear scan.

5. Apparatus for reading an anti-counterfeiting marking comprising light sensing means for determining the relative density of each elemental area in a set of elemental areas occupying predetermined positions within, and with respect to, a notional window in the area of such marking and means for deriving from the densities so determined a numerical value statistically representative of said set, said apparatus including scanning means adapted to conduct a scan of said window over the area of said marking and to determine such a value for each of a plurality of reference positions of such window within such scan, and means to determine from said values a corresponding indicator or string, the apparatus further including means for displaying the last-noted number of text or for comparing it, for validation purposes with a predetermined string or indicator, said anti-counterfeiting marking being for documents, which marking is disguised as an incidental or artistic feature of an overall marking on the documents, but is adapted to be read by a complementary reading device, and said apparatus being adapted for use in reading items having a coded area which is statistically fractal, the apparatus being arranged to calculate said values as at least approximately the fractal dimension of the portion of the marking within said window.

6. Apparatus according to claim 5 in which said predetermined positions are successive positions in a linear series of such positions and the apparatus is adapted to scan said window along a line parallel with a notional line along which said predetermined positions are disposed.

7. Apparatus for reading an anti-counterfeiting marking in which the apparatus is adapted to effect a raster scan of the coded area of the item, with each line of the raster being treated as a respective linear scan, said anti-counterfeiting marking being for documents, which marking is disguised as an incidental or artistic feature of overall marking on the documents, but is adapted to be read by a complementary reading device, and said apparatus being adapted for use in reading items having a coded area which is statistically fractal, the apparatus being arranged to calculate said values as at least approximately the fractal dimension of the portion of the marking within said window.

* * * * *

UNITED STATES PATENT AND TRADEMARK OFFICE

CERTIFICATE OF CORRECTION

PATENT NO. : 6,674,875 B1
DATED : January 6, 2004
INVENTOR(S) : Nicholas John Phillips et al.

It is certified that error appears in the above-identified patent and that said Letters Patent is hereby corrected as shown below:

Column 1,
Line 55, "bar bode" should read -- bar code --.

Column 8,
Line 15, "ship" should read -- strip --.

Column 9,
Line 52, "valiant" should read -- variant --.

Column 12,
Line 52, "positions" should read -- portions --.

Column 13,
Line 20, "apertuwe" should read -- aperture --.

Signed and Sealed this

Fifteenth Day of June, 2004

JON W. DUDAS
*Acting Director of the United States Patent and Trademark Office*